UNITED STATES PATENT OFFICE.

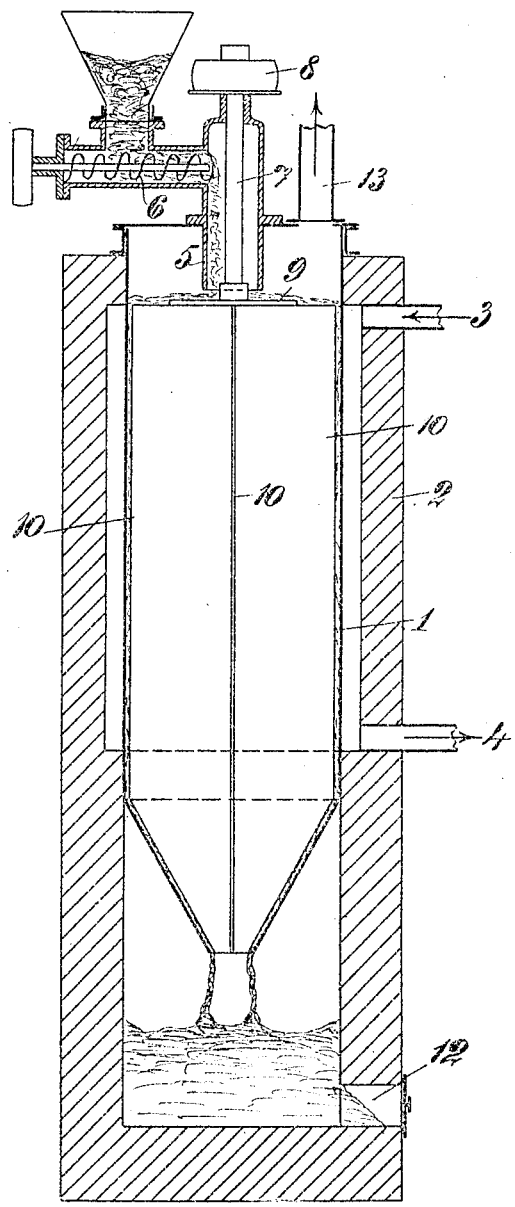

CARL GUSTAF PATRIK DE LAVAL, OF STOCKHOLM, SWEDEN.

METHOD OF EXTRACTING IRON.

No. 913,405.  Specification of Letters Patent.  Patented Feb. 23, 1909.

Application filed October 19, 1907. Serial No. 398,209.

*To all whom it may concern:*

Be it known that I, CARL GUSTAF PATRIK DE LAVAL, doctor of philosophy and engineer, a citizen of Sweden, residing at Stockholm, Sweden, have invented new and useful Improvements in the Methods of Extracting Iron, of which the following is a specification.

The present invention refers to a method of extracting iron from a finely pulverized charge of iron ore, carbon and slag producing agents, consisting therein, that said charge in a thin layer is brought into contact with a heated surface, whereby the required reduction is carried out. The method is properly made continuous by introducing the charge continually and with proper speed into a vertical shaft, which is heated from the outside, and in which the charge by means of rotating vanes or the like is thrown in a thin layer towards the heated wall of the shaft, whereby it gradually moves downwards and is gathered in a reduced condition in a chamber underneath the shaft.

The drawing shows a vertical section of an apparatus, which may be employable for carrying out the method above described.

1 indicates a vertical shaft, which is heated by introducing hot gases in the space between the shaft 1 and the brickwork 2 surrounding the shaft. 3 indicates the inlet and 4 the outlet of said gases. Centrally through the roof of the shaft 1 extends a pipe 5, in which opens a screw conveyer 6 for the pulverized charge. A shaft 7 extends through the pipe 5 centrally, which shaft can be rotated from the pulley 8. The shaft 7 carries a disk 9 underneath the lower opening of the pipe 5, to which disk are fixed vanes 10, which are arranged in the form of a cross. The vanes extend nearly to the wall of the shaft 1, as shown on the drawing. The shaft 1 is funnel shaped below and opens in a chamber 11, in which the reduced charge gathers and from which it can be taken out through the opening 12.

The pulverized charge, which may be composed in any well known manner for reducing iron from iron ore, thus generally spoken of iron ore, carbon and slag producing agents, and which is fed to the pipe 5 by the screw conveyer 6, falls through the pipe down on the rotating disk 9, by which it is spread in a thin layer, which is caught by the vanes 10 and thrown towards the hot wall of the shaft 1. The charge gradually descends when thrown out in said manner, and the reduction is performed when the charge is in contact with the wall of the shaft. The gases developed exhaust through the outlet 13 and may be led to a regenerator, if desired, in which the gases, necessary for heating the shaft 1, are heated.

What I claim is:—

1. The method of extracting iron from a pulverized charge, consisting in introducing said pulverized charge continually in the upper part of a vertical shaft, heated from the outside, and subjecting the charge to the influence of the centrifugal force in said shaft, so as to be thrown towards the wall of the shaft.

2. The method of extracting iron from a pulverized charge of iron ore and reducing agents, consisting in introducing said pulverized charge continually in a vertical shaft, heated from the outside, and throwing the charge by mechanical means towards the wall of the shaft.

3. The method of extracting iron from a pulverized charge of iron and reducing agents, consisting in introducing the charge continually in a vertical shaft, heated from the outside, and bringing the charge in contact with the inner wall of said shaft.

4. A method of extracting iron from a pulverized charge, consisting in introducing said pulverized charge into the upper part of an upright heated shaft, and spreading said charge over the inner surface of said shaft.

In testimony whereof I have signed my name to this specification in the presence of two subscribing witnesses.

CARL GUSTAF PATRIK DE LAVAL.

Witnesses:
 WOLDEMAR BOMAN,
 I. EKEBOHM.